C. H. LASSITER.
CONCRETE CASING MAKING MACHINE.
APPLICATION FILED DEC. 6, 1920.
1,430,451.                                  Patented Sept. 26, 1922.
                                                 4 SHEETS—SHEET 1.
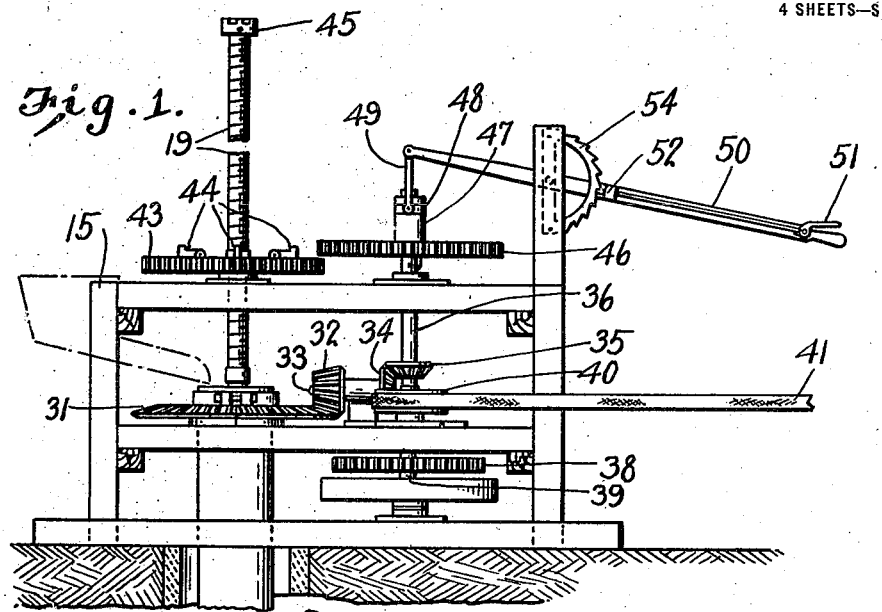
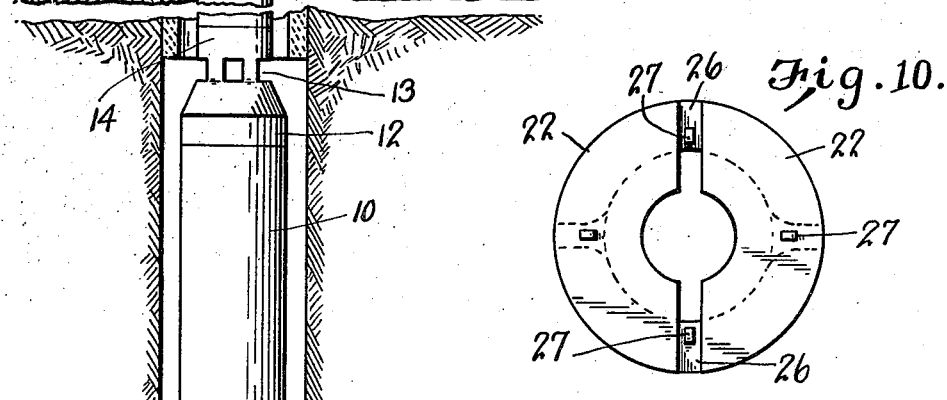
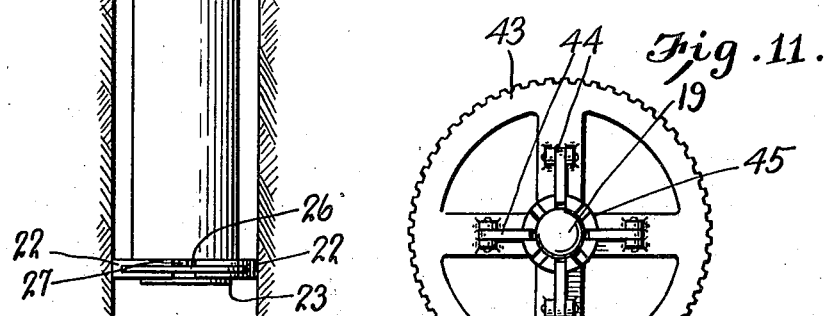
Charles H. Lassiter
INVENTOR C. H. LASSITER.
CONCRETE CASING MAKING MACHINE.
APPLICATION FILED DEC. 6, 1920.
1,430,451.
Patented Sept. 26, 1922.
4 SHEETS—SHEET 2.
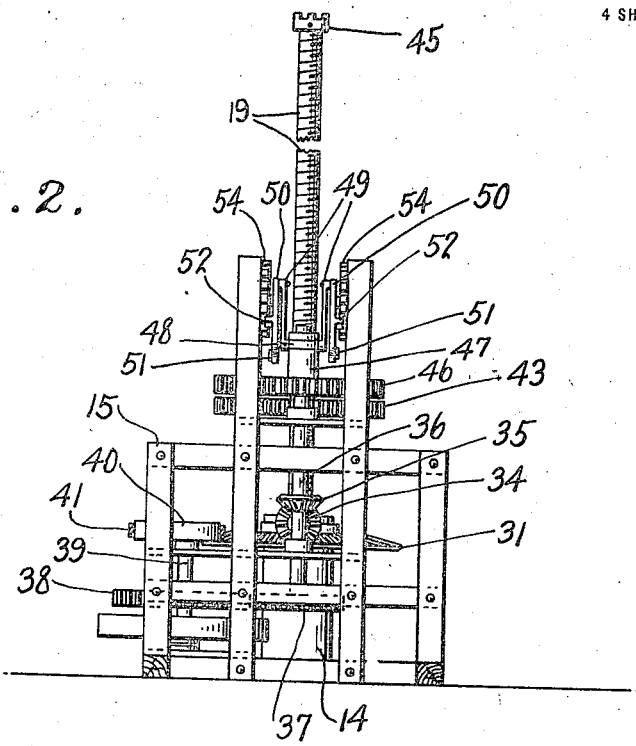
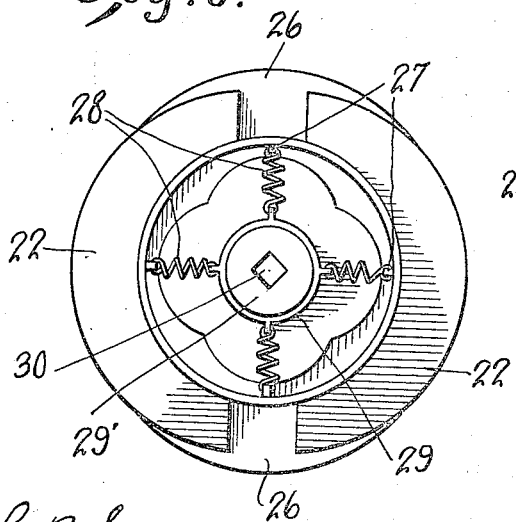
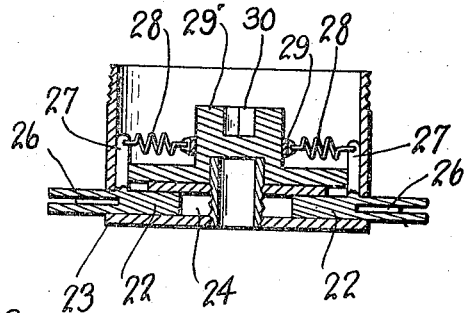
Charles H. Lassiter
INVENTOR C. H. LASSITER.
CONCRETE CASING MAKING MACHINE.
APPLICATION FILED DEC. 6, 1920.
1,430,451.
Patented Sept. 26, 1922.
4 SHEETS—SHEET 3.
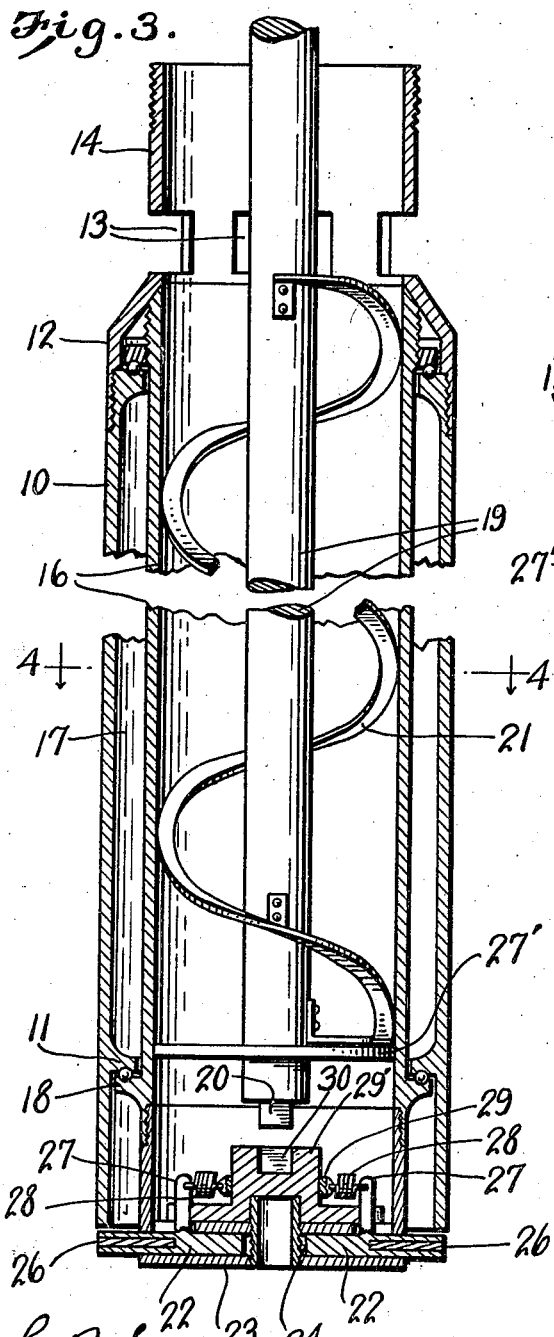
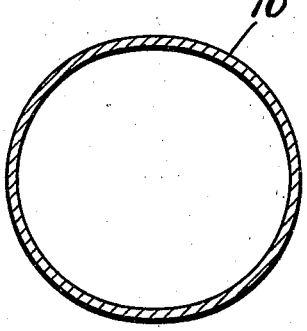
Charles H. Lassiter
INVENTOR
BY *Victor J. Evans*
ATTORNEY

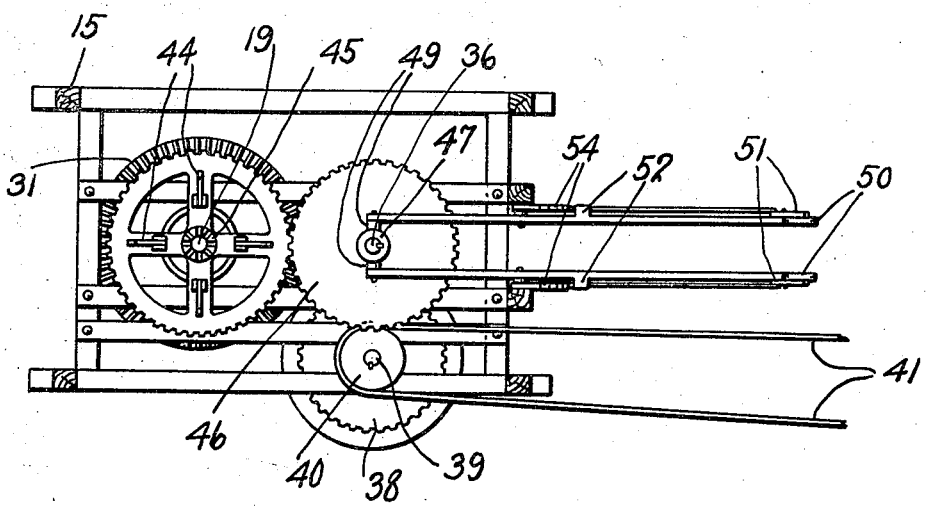
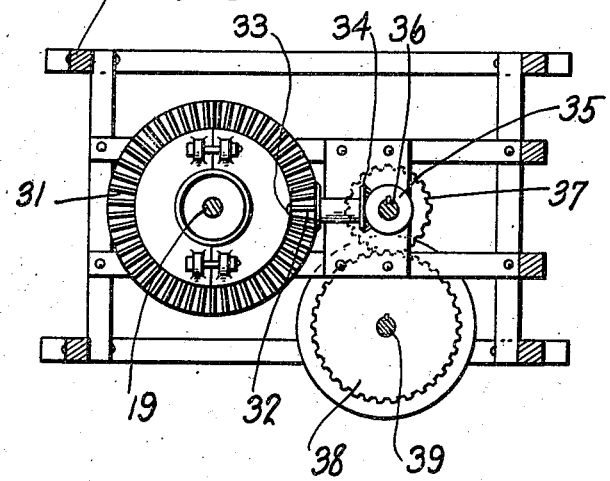
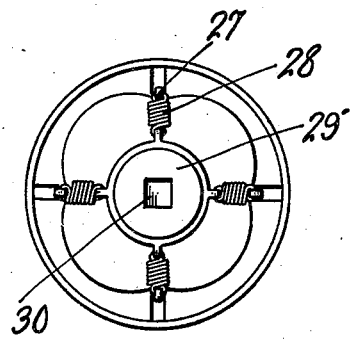

Patented Sept. 26, 1922.

1,430,451

UNITED STATES PATENT OFFICE.

CHARLES H. LASSITER, OF VALENTINE, TEXAS.

CONCRETE-CASING-MAKING MACHINE.

Application filed December 6, 1920. Serial No. 428,712.

*To all whom it may concern:*

Be it known that I, CHARLES H. LASSITER, a citizen of United States, residing at Valentine, in the county of Jeff Davis and State of Texas, have invented new and useful Improvements in Concrete-Casing-Making Machines, of which the following is a specification.

This invention relates to well machinery and has for its object the provision of a novel device by means of which a concrete lining may be applied within a well to form a casing therefor, regardless of the type of well.

An important object is the provision of a device of this character which is formed as a concrete or cement mixer and also as a distributor for placing the mixed material within the well at any desired location therein, means being furthermore provided whereby this lining may be smoothed off.

Another object is the provision of a device of this character which includes means whereby the agitating or mixing member may be raised or lowered and also including means whereby the agitating or mixing member may be rotated, means being provided whereby the different movements may be accomplished when desired.

A further object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawings in which—

Figure 1 is a side elevation of my device in applied position within a well,

Figure 2 is a view taken at right angles to Figure 1,

Figure 3 is a longitudinal sectional view through the mechanism disposed within the well, Figure 4 is a cross sectional view therethrough on the line 4—4 of Figure 3, Figure 5 is a cross sectional view on the line 5—5 of Figure 3, showing the expansible bottom in contracted position, Figure 6 is a similar view showing the expansible member in its other position, Figure 7 is a plan view of the mechanism mounted at the top of the well, Figure 8 is a horizontal sectional view therethrough, and The remaining figures are detail views.

Referring more particularly to the drawings, the numeral 10 designates a barrel of cylindrical or slightly oval form adapted for insertion within a well formed at its lower end with a bearing 11. Threadedly connected with the upper end of this barrel 10 is a reducing nipple 12 which is provided with ports 13 and from which leads an upwardly extending reduced extension 14 leading up through the top of the well and through a platform 15 disposed above the top thereof.

Located within the barrel 10 is a mixing cylinder 16 which is cylindrical in form and which is spaced from the barrel 10 so as to provide an annular space 17 between these two members. At its lower end the cylindrical member 16 is provided with a bearing 18 engaging and rotatable upon the bearing 11. Located within the cylindrical member 16 is a central shaft 19 provided at its lower end with a squared end 20 and having secured thereon intermediate its ends an auger-like conveyor or agitator member 21.

Disposed at the lower ends of the barrel 10 and mixing member 16 is an expansible head or bottom closure including a pair of substantially semi-circular disks 22 slidable upon the guide disk 23 and having a relatively large opening 24 with which communicate lateral openings 25 extending to the peripheries of the disks 22 and 23. The disk 22 carries a plurality of laterally movable members 26 which have extensions 27 to which are connected coil springs 28 which are in turn connected with a head portion 29 formed on the disk 22. This hub portion is formed with a rectangular socket 30 engageable by the squared end 20 of the shaft 19. This construction constitutes in effect an expansible cam member which is so constructed that when the hub member 29 and consequently the disk members 22 are rotated relatively to the disk 23, an expansible action of the members 26 will be effected so as to move them into engagement with the wall of the well. Secured upon the lower portion of the shaft 19 is a plate 27 likewise formed as a disk and forming the lower end for the conveyor or agitator 21.

The shaft 19 extends a considerable distance above the platform 15 at the top of the well and has its upper projecting end threaded, as shown. Splined upon the upper portion of the pipe 14 is a bevel gear 31, with which meshes a pinion 32 carried by a shaft 33. This shaft 33 carries another bevel pinion 34 meshing with a bevel pinion 35 carried by a shaft 36 upon which is secured a spur gear 37 meshing with a gear 38 mounted upon the shaft 39 equipped with a pulley 40 driven by a belt 41 which is in turn driven from any suitable source of power.

Secured upon the platform 15 are supports 42 secured in spaced relation thereabove and located above the supports is a gear 43 formed of an inner portion 43$^a$ threaded onto the shaft 19 and having its upper edge formed with notches 43$^b$. This gear 43 further includes an outer portion 43$^c$ carrying a plurality of pivoted dogs 44 which may be so swung as to be engaged within the notches 43 whereby to lock the inner and outer portions of this gear together. The upper extremity of the shaft 19 carries a castellated head 45 engageable by a suitable tool to effect rotation of the shaft 19 manually in case of necessity.

The shaft 36 also carries a gear 46 which is designed to mesh with the gear 43 and this gear 46 is splined upon the shaft 36 and carries a grooved collar 47 engaged by a pair of forks 48 connected with separate links 49 which are in turn connected with operating levers 50 pivoted upon standards 51 rising from the platform 15. These levers 50 are provided with hand grips 52 connected by the usual means with latches 53 movable over notched segments 54 carried by the uprights 51.

The operation of the device is as follows:

Sand, gravel, cement, and water are fed into the mixing cylinder 16 when the parts are so positioned that the barrel 10 is located in that portion of the well within which it is desired to place a lining or casing. The pulley 40 being rotated by the belt 41 results in rotation of the gear 38 and consequently the gear 37, shaft 36, pinion 35, pinion 34, shaft 33, and pinion 32 which will result in rotation of the gear 31 secured upon the pipe 14. The shaft 19 is then stationary and the rotation of the pipe with respect to the shaft 19 and blade 21 will effect the mixing of the material. When the levers 50 are in such position that the gear 46 meshes with the gear 43 the shaft 19 will be rotated, that is in the event that the locking dogs 44 are in such position as to lock the gear section 43$^b$ rigidly with respect to the ring 43$^a$ threaded upon the shaft 19. When the parts are in this position rotation of the shaft 19 will be effected, which will result in upward movement of the shaft 19 and bottom member 27', movement of which will elevate the mixture so that the cement will pass through the openings 13 and drop down into the well between the walls thereof and the barrel 10. The barrel 10 is of course rotated by the rotation of the pipe 14 and will exert a smoothing action for finishing the inner surface of the lining or casing formed by the concrete. When the levers 50 are pressed downwardly the gear 46 will be moved out of mesh with the gear 43 so that the agitator member 21 and shaft 19 will be idle, the pipe 14 and barrel 10 rotating alone.

From the foregoing description and a study of the drawings it will be apparent that I have thus provided a simply constructed and consequently inexpensive device which is readily operable to line a well or form a casing therein at any desired location, my device being so constructed as to use plastic material entirely and therefore form a sanitary and practically everlasting lining.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising a barrel, means for rotating said barrel, a cylinder within the barrel, a shaft rotatable within the cylinder and carrying a disk fitting therein, combined agitator and conveyor blades carried by the shaft, said barrel being provided above the conveyor blades with openings, a cutter head mounted at the lower end of said barrel and formed with a socket, the lower end of the shaft being formed with a portion designed for engagement within said socket, and means for moving the shaft longitudinally to bring its lower end into or out of engagement within said socket, and means for rotating the shaft.

2. A device of the character described comprising a rotary barrel, a cylinder within the barrel, a shaft rotatable within said cylinder, a combined agitator and conveyor blade arranged spirally upon the shaft, said barrel being provided above said conveyor with openings, a cutter head rotatably mounted at the lower end of the barrel and cylinder and formed in its upper surface with a rectangular socket the lower end of said shaft being formed with an angular extension designed for engagement within said socket, a disk on the lower end of said shaft forming a closure for the cylinder, means for rotating the shaft, and independent means for moving said shaft longitudinally to bring said angular extension into or out of engagement within said socket, and for raising said disk to the upper portion of the cylinder for expelling the contents thereof.

3. A device of the character described comprising a barrel, means for rotating said barrel, a cylinder within the barrel, a shaft rotatable within said cylinder and carrying a spiral blade constituting a combined agitator and conveyor, a disk on the lower end of the shaft fitting within the cylinder said barrel being provided with openings above the upper end of the conveyor blades, a head rotatably mounted at the lower end of the barrel and cylinder, means for moving said shaft longitudinally whereby to bring its lower end into and out of drive connection with said head, a gear threaded upon said shaft and means for rotating said gears in one direction or the other whereby to effect said longitudinal movement of the shaft.

4. A device of the character described comprising a barrel, means for rotating said barrel, a cylinder within said barrel, a shaft rotatable within said cylinder carrying a disk closing the cylinder, a combined agitator and conveyor carried by said shaft, said barrel being provided above said conveyor with openings, a cutter head engageable by the lower end of said shaft whereby to be driven thereby, means for rotating said shaft, and other means for effecting longitudinal movement thereof whereby to cause engagement or disengagement with the cutter head and to raise the disk for expelling the contents of the cylinder.

5. A device of the character described comprising a barrel, means for rotating said barrel, a cylinder within said barrel, a shaft rotatable within said cylinder carrying a disk forming a closure for the lower end of the cylinder, a combined agitator and conveyor blades carried by said shaft, said barrel being provided above said conveyor with openings, a cutter head mounted at the lower end of said shaft, the upper end of said barrel and cylinder being threaded, a gear adapted to be selectively clamped for rotation with or adjusted for rotation upon said shaft, said gear being threadedly engaged with said shaft, and means for rotating said gear whereby to raise and lower the shaft for making or breaking the drive connection with the cutter head, and means for raising said disk whereby to expel the contents of the cylinder.

6. A device of the character described comprising a barrel, means for rotating said barrel, a cylinder within said barrel, a shaft rotatable within said cylinder carrying a disk forming a closure for the lower end of the cylinder, a spiral blade constituting a combined agitator and conveyor carried by said shaft, said barrel being provided above said conveyor with openings, a cutter head mounted at the lower end of said barrel and cylinder, the upper end of said shaft being threaded, a gear threaded upon said shaft, means for locking said gear rigid with respect to said shaft, whereby to raise and lower the cylinder into and out of drive relation to the cutter head, and means for rotating said gear in either direction, the upward movement of the shaft resulting in moving the disk upwardly whereby to expel the contents of the cylinder.

7. A device of the character described comprising a barrel, a cylinder rotatably mounted within the barrel, gear operated means for rotating the cylinder, a cutter head rotatably mounted at the lower end of the cylinder and barrel and formed with an angular socket, a shaft rotatably mounted within the cylinder, a disk at the lower end of said shaft forming a closure for the cylinder, the lower end of said shaft being formed with an angular extension adapted for engagement within said socket, the upper end of said shaft being threaded, a member threadedly engaged upon the upper end of said shaft, a ring gear rotatably mounted with respect to said member, means for driving said gear in either direction, and locking means associated with said gear and said member whereby to lock the tube for rotation as one.

In testimony whereof I affix my signature.

CHARLES H. LASSITER.